United States Patent
Fujishiro et al.

(10) Patent No.: US 12,490,132 B2
(45) Date of Patent: Dec. 2, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 518 days.

(21) Appl. No.: 17/666,151

(22) Filed: Feb. 7, 2022

(65) Prior Publication Data

US 2022/0167198 A1 May 26, 2022

Related U.S. Application Data

(63) Continuation of application No. PCT/JP2020/030004, filed on Aug. 5, 2020.

(60) Provisional application No. 62/884,275, filed on Aug. 8, 2019.

(51) Int. Cl.
    *H04W 24/10* (2009.01)
    *H04W 76/27* (2018.01)

(52) U.S. Cl.
    CPC ........... *H04W 24/10* (2013.01); *H04W 76/27* (2018.02)

(58) Field of Classification Search
    CPC ..... H04W 24/10; H04W 76/27; H04W 76/19; H04W 16/28; H04W 4/06
    See application file for complete search history.

(56) References Cited

U.S. PATENT DOCUMENTS

| | | | |
|---|---|---|---|
| 8,369,860 B2 | 2/2013 | Zhang et al. | |
| 9,277,437 B2 | 3/2016 | Wu | |
| 9,531,558 B2 | 12/2016 | Wu | |
| 9,781,706 B2 | 10/2017 | Zhang et al. | |
| 10,057,888 B2 | 8/2018 | Cave et al. | |
| 10,700,752 B2* | 6/2020 | Jung | H04B 7/0695 |
| 2006/0014557 A1* | 1/2006 | Rajkotia | H04W 52/50 |
| | | | 455/69 |
| 2013/0195055 A1 | 8/2013 | Zhang et al. | |

(Continued)

FOREIGN PATENT DOCUMENTS

| | | |
|---|---|---|
| CN | 104581777 A | 4/2015 |
| JP | 2014-147131 A | 8/2014 |

(Continued)

OTHER PUBLICATIONS

Vivo, "MDT Measurement quantities and UE impact", 3GPP TSG-RAN WG2#105bis, R2-1903344, Apr. 8-12, 2019, 4 pages, Xi'an, China.

(Continued)

*Primary Examiner* — Jamal Javaid
(74) *Attorney, Agent, or Firm* — Studebaker Brackett PLLC

(57) ABSTRACT

A communication control method is a method executed by a user equipment. The communication control method includes transmitting, to a network, a failure report related to a failure in a procedure related to RRC connection executed by the user equipment when the user equipment exists in enhanced coverage of a serving cell. The failure report includes enhancement state information indicating a coverage enhancement state of the user equipment in the enhanced coverage, and failure count information associated with the enhancement state information. The failure count information indicates the number of times the user equipment fails in the procedure in the coverage enhancement state.

3 Claims, 14 Drawing Sheets

(56) References Cited

U.S. PATENT DOCUMENTS

| | | | |
|---|---|---|---|
| 2015/0222345 A1* | 8/2015 | Chapman | H04B 7/0617 |
| | | | 370/332 |
| 2015/0373507 A1 | 12/2015 | Jung et al. | |
| 2019/0208436 A1* | 7/2019 | Zhou | H04B 7/088 |
| 2020/0204329 A1 | 6/2020 | Fujishiro et al. | |
| 2022/0217769 A1 | 7/2022 | Takahashi et al. | |

FOREIGN PATENT DOCUMENTS

| | | |
|---|---|---|
| JP | 2015-133704 A | 7/2015 |
| JP | 2017-060182 A | 3/2017 |
| WO | 2018/056108 A1 | 3/2018 |
| WO | 2018/063086 A1 | 4/2018 |
| WO | 2020/167226 A1 | 8/2020 |
| WO | 2020/170404 A1 | 8/2020 |

OTHER PUBLICATIONS

ZTE Corporation, Sanechips; "Remaining issues for RLF report in NB-Iot", 3GPP TSG-RAN WG2 meeting #105; R2-1901463; Feb. 25-Mar. 1, 2019; pp. 1-5; Athens, Greece.

Huawei, HiSilicon; "MDT enhancement for CHIBA issue", 3GPP TSG-RAN WG2 meeting #87; R2-143653; Aug. 18-22, 2014; pp. 1-6; Dresden, Germany.

CMCC, "Discussion on NR MDT accessibility information reporting", 3GPP T SG-RAN WG2 Meeting #106, Reno, USA, May 13-17, 2019, R2-1905940, total 10 pages.

* cited by examiner

COMMUNICATION CONTROL METHOD

RELATED APPLICATIONS

The present application is a continuation based on PCT Application No. PCT/JP2020/030004, filed on Aug. 5, 2020, which claims the benefit of U.S. Provisional Patent Application No. 62/884,275 filed on Aug. 8, 2019. The content of which is incorporated by reference herein in their entirety.

TECHNICAL FIELD

The present disclosure relates to a communication control method used in a mobile communication system.

BACKGROUND ART

In the Third Generation Partnership Project (3GPP), which is a standardization project for cellular communication systems, a function for Minimization of Drive Tests (MDTs) has been specified. With the MDT function, a user equipment measures a radio environment and reports measurement information regarding the radio environment to a network along with position information regarding the user equipment, thus enabling detection of, for example, coverage holes and the like to achieve optimization of the network and the like.

On the other hand, a user equipment is known that is intended for Machine Type Communication (MTC) and Internet of Things (IoT) services. Such user equipment is limited in transmission and/or reception bandwidth to achieve reduced cost, enhanced coverage, and reduced power consumption. Such user equipment employs coverage enhancement functions including repetition transmission (repetition) and the like such that the user equipment can also be used in poor radio environments.

In a case where the MDT function is applied to a user equipment to which the coverage enhancement function is applied, a new mechanism is considered to be needed which is not included in the known MDT function.

SUMMARY

A communication control method according to an embodiment is a method executed by a user equipment. The communication control method includes transmitting, to a network, a failure report related to a failure in a procedure related to RRC connection executed by the user equipment when the user equipment exists in enhanced coverage of a serving cell. The failure report includes enhancement state information indicating a coverage enhancement state of the user equipment in the enhanced coverage, and failure count information associated with the enhancement state information. The failure count information indicates the number of times the user equipment fails in the procedure in the coverage enhancement state.

A communication control method according to an embodiment is a method executed by a user equipment. The communication control method includes: storing a measurement value of a radio environment of the user equipment in a case that a procedure related to RRC connection executed by the user equipment fails when the user equipment exists in a serving cell; when the procedure fails a plurality of times, calculating one statistical value from a plurality of times measurement values corresponding to the plurality of times stored in the storing step; and transmitting, to a network, a failure report including the one statistical value calculated.

A communication control method according to an embodiment is a method executed by a user equipment. The communication control method includes: storing, when reception of SC-PTM for providing an MBMS service fails, radio environment information related to a radio environment of the user equipment at a time when the reception of the SC-PTM fails; and transmitting, to a network, a failure report including the radio environment information stored. The failure report further includes a service identifier indicating the MBMS service.

DESCRIPTION OF EMBODIMENTS

A mobile communication system according to an embodiment will be described with reference to the drawings. In the description of the drawings, the same or similar parts are denoted by the same or similar reference signs.

Mobile Communication System

First, a configuration of a mobile communication system according to an embodiment will be described. Although the mobile communication system according to an embodiment is a 5G system of the 3GPP, LTE may be at least partially applied to the mobile communication system.

Figure 1:
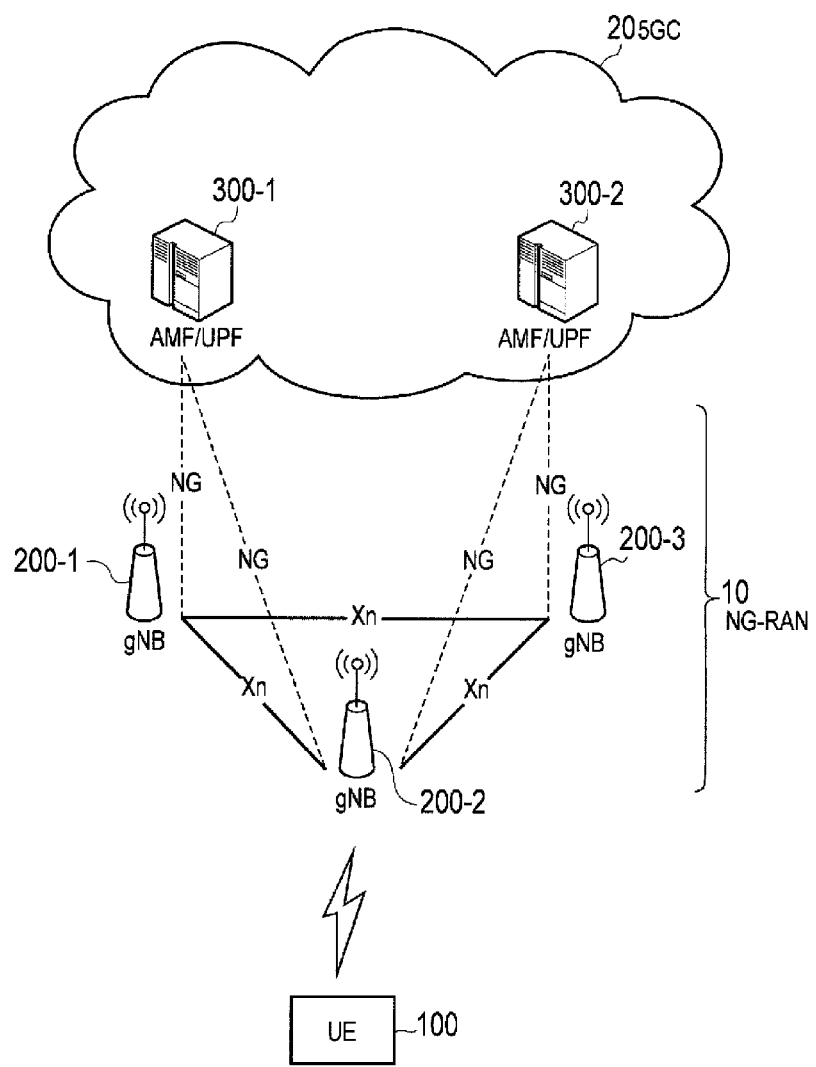
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs radio communication with the UE 100 that has established a connection with its own cell. The gNB 200 has a radio resource management (RRM) function, a function of routing user data (hereinafter simply referred to as "data"), a measurement control function for mobility control and scheduling, and the like. A "cell" is used as a term to indicate a minimum unit of a radio communication area. A "cell" is also used as a term to indicate a function or a resource for performing radio communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
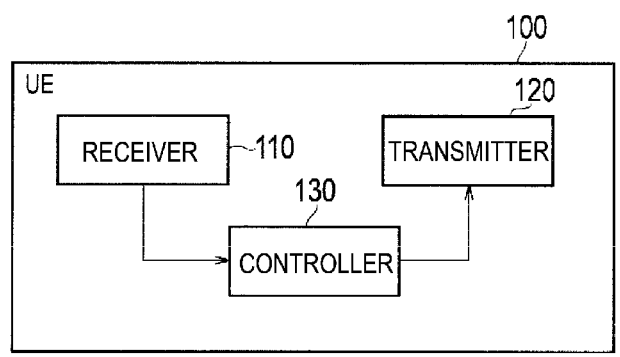
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs modulation and demodulation, and coding and decoding of a baseband signal, and the like. The CPU executes the programs stored in the memory to perform various kinds of processes.

Note that the UE 100 may further include a position sensor such as a Global Navigation Satellite System (GNSS) receiver.

Figure 3:
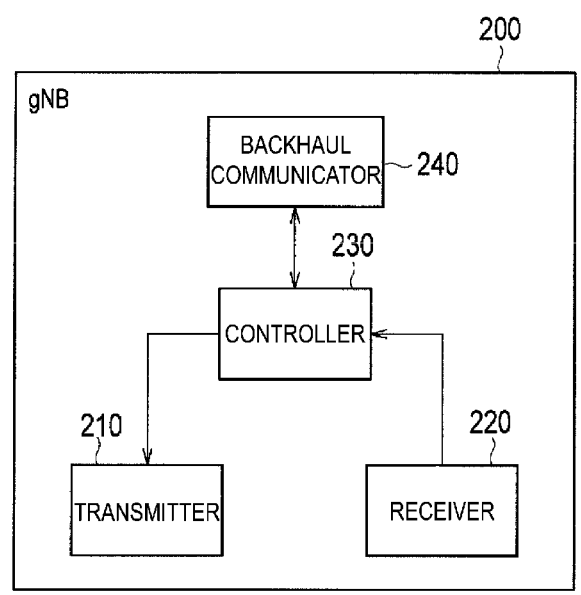
FIG. 3 is a diagram illustrating a configuration of a base station according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
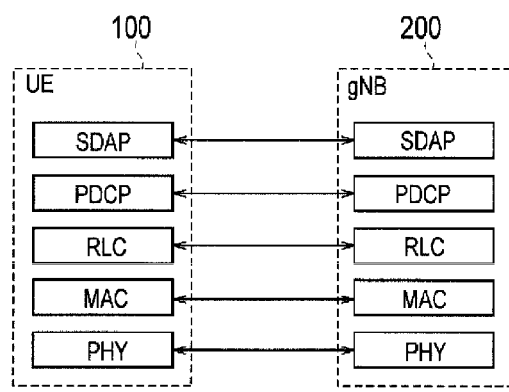
FIG. 4 is a diagram illustrating a configuration of a radio interface protocol stack in a user plane according to an embodiment.

FIG. 4 is a diagram illustrating a configuration of a protocol stack of a radio interface of a user plane for handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP may not be provided.

Figure 5:
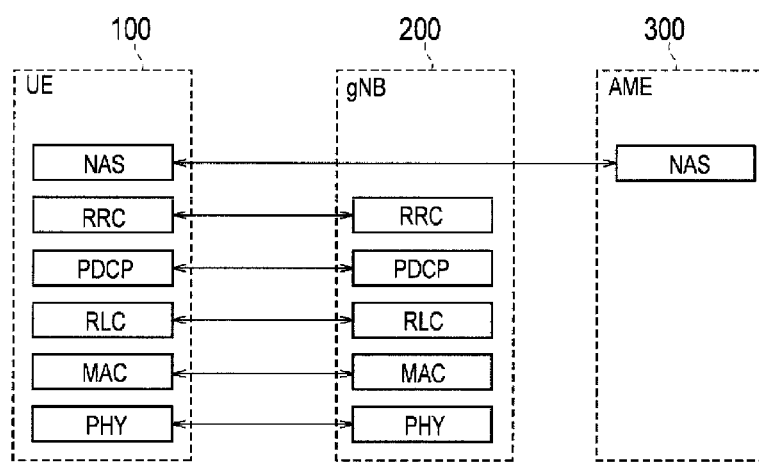
FIG. 5 is a diagram illustrating a configuration of a radio interface protocol stack in a control plane according to an embodiment.

FIG. 5 is a diagram illustrating a configuration of a protocol stack of a radio interface of a control plane handling signaling (control signals).

As illustrated in FIG. 5, the protocol stack of the radio interface of the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection between the RRC of the UE 100 and the RRC of the gNB 200 (RRC connection), the UE 100 is in an RRC idle state. When RRC connection is suspended, the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Figure 6A:
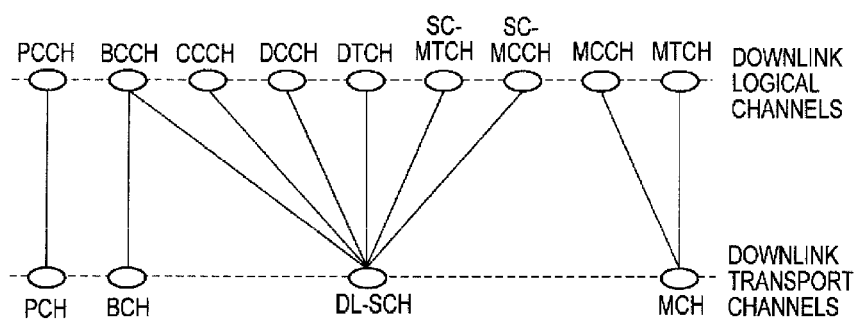
FIG. 6A is a diagram illustrating mapping between downlink logical channels and transport channels in the mobile communication system according to an embodiment.
Figure 6B:
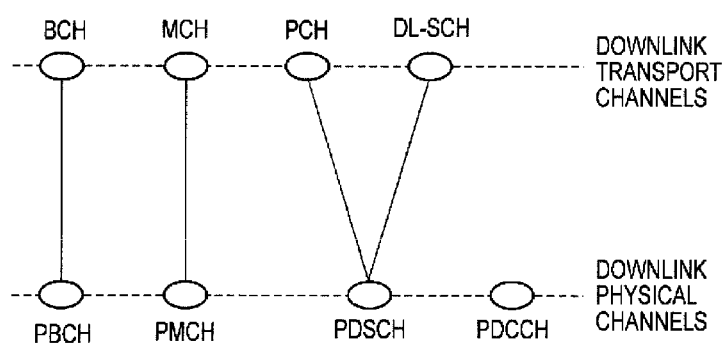
FIG. 6B is a diagram illustrating mapping between transport channels and physical channels in the mobile communication system according to an embodiment.

FIG. 6A and FIG. 6B are each a diagram illustrating a configuration of downlink channels of the mobile communication system according to an embodiment. FIG. 6A illustrates mapping between logical channels (downlink logical channels) and transport channels (downlink transport channels).

As illustrated in FIG. 6A, a paging control channel (PCCH) is a logical channel for giving a notification about paging information and system information change. The PCCH is mapped to a paging channel (PCH) being a transport channel.

A broadcast control channel (BCCH) is a logical channel for system information. The BCCH is mapped to a broadcast control channel (BCH) and a downlink shared channel (DL-SCH), each of which is a transport channel.

A common control channel (CCCH) is a logical channel for transmission control information between the UE 100 and the gNB 200. The CCCH is used when the UE 100 does not have RRC connection with a network. The CCCH is mapped to the DL-SCH.

A dedicated control channel (DCCH) is a logical channel for transmitting specific control information between the UE 100 and a network. The DCCH is used when the UE 100 has RRC connection. The DCCH is mapped to the DL-SCH.

A dedicated traffic channel (DTCH) is a specific logical channel for data transmission. The DTCH is mapped to the DL-SCH.

A single cell multicast traffic channel (SC-MTCH) is a logical channel for SC-PTM. The SC-MTCH is a one-to-many channel (point-to-multipoint downlink channel) for performing multicast transmission of data (MBMS) from a network to the UE 100 by using SC-PTM. Details of SC-PTM will be described later.

A single cell multicast control channel (SC-MCCH) is a logical channel for SC-PTM. The SC-MCCH is a one-to-many channel (point-to-multipoint downlink channel) for performing multicast transmission of MBMS control information for one or a plurality of SC-MTCHs from a network to the UE 100. The SC-MCCH is used for the UE 100 that receives the MBMS by using SC-PTM or that is interested in the reception. Only one SC-MCCH exists for one cell.

A multicast control channel (MCCH) is a logical channel for an MBSFN. The MCCH is used for transmission of MBMS control information for an MTCH from a network to the UE 100. The MCCH is mapped to a multicast channel (MCH) being a transport channel.

A multicast traffic channel (MTCH) is a logical channel for an MBSFN. The MTCH is mapped to the MCH.

FIG. 6B illustrates mapping between transport channels (downlink transport channels) and physical channels (downlink physical channels).

As illustrated in FIG. 6B, the BCH is mapped to a physical broadcast channel (PBCH).

The MCH is mapped to a physical multicast channel (PMCH). The MCH supports an MBSFN including a plurality of cells.

The PCH and the DL-SCH are each mapped to a physical downlink shared channel (PDSCH). The DL-SCH supports HARQ, link adaptation, and dynamic resource allocation.

A physical downlink control channel (PDCCH) carries resource allocation information of the PDSCH (DL-SCH, PCH), HARQ information related to the DL-SCH, and the like. The PDCCH carries an uplink scheduling grant.

MDT Function

Now, an overview of an MDT function will be described. A mobile communication system according to an embodiment supports the MDT function.

In the MDT, the gNB 200 transmits, to the UE 100, a configuration message for configuring MDT measurement. Then, the gNB 200 collects MDT measurement information from the UE 100. For example, the gNB 200 is directly or indirectly connected to a server for the MDT. The server for the MDT acquires the MDT measurement information from the gNB 200 and performs network optimization including coverage optimization, based on the MDT measurement information.

The MDT includes two types, i.e., logged MDT and immediate MDT.

In the logged MDT, the UE 100 in an RRC idle state, an RRC inactive state, or an RRC connected state performs radio measurement, records the measurement results along with UE position information and a timestamp, and transmits a report including the recorded measurement results and the like in response to a request from the network (gNB 200).

In the immediate MDT, the UE 100 in the RRC connected state performs radio measurement and measurement of other items, and transmits a report including the measurement result and the UE position information to the network (gNB 200). The configuration message for configuring the immediate MDT may be a measurement configuration message including an information element requesting inclusion of the UE position information in the measurement report.

In the MDT, the UE 100 stores each piece of failure information to be described later, and transmits a failure report including the piece(s) of failure information Coverage Enhancement Function Now, an overview of the coverage enhancement function will be described. A mobile communication system according to an embodiment supports the coverage enhancement function.

For the UE 100 intended for the Machine Type Communications (MTC) and IoT service, the transmission and/or reception bandwidth is limited to only a part of a system transmission and/or reception band. For example, in LTE, such categories of the UE 100 are referred to as a category M1 and a category Narrow Band (NB)-IoT. The category M1 is a category to which an enhanced MTC (eMTC) UE belongs. The category NB-IoT (category NB1) is a category to which an NB-IoT UE belongs.

In the category M1, the transmission and/or reception bandwidth of the UE 100 (eMTC UE) is limited to 1.08 MHz (i.e., the bandwidth of the six resource blocks), for example. In the category NB-IoT (category NB1), the transmission and/or reception bandwidth of the UE 100 (NB-IoT UE) is further limited to 180 kHz (i.e., the bandwidth of one resource block). Such band narrowing leads to reduced cost and reduced power consumption required for the eMTC UE and the NB-IoT UE.

Figure 7:
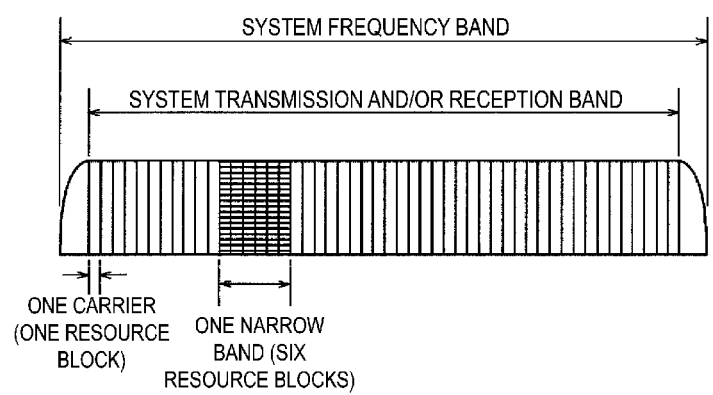
FIG. 7 is a diagram illustrating a frequency channel handled by an eMTC UE and an NB-IoT UE.

FIG. 7 is a diagram illustrating a frequency channel handled by the eMTC UE and the NB-IoT UE.

As illustrated in FIG. 7, the frequency bandwidth of the system frequency band of the mobile communication system may be 10 MHz. The bandwidth of the system transmission and/or reception band is, for example, 50 resource blocks=9 MHz. The bandwidth of the frequency channel that can be supported by the eMTC UE is six resource blocks or less=1.08 MHz or less.

The frequency channel of 6 resource blocks or less that can be supported by the eMTC UE is referred to as a "narrow band (NB)". The bandwidth of the frequency channel that can be supported by the NB-IoT UE is one resource block=180 kHz. The frequency channel of one resource block that can be supported by the NB-IoT UE is referred to as a "carrier."

The UE 100 of the category M1 cannot receive a downlink radio signal transmitted in a bandwidth wider than six resource blocks, and thus cannot receive a normal PDCCH. Thus, an MTC-PDCCH (MPDCCH) being a PDCCH for MTC is introduced. For a similar reason, an NB-PDCCH (NPDCCH) being a PDCCH for NB-IoT is introduced.

The eMTC UE is operated within an LTE transmission and/or reception bandwidth. The NB-IoT UE supports a form in which the UE is operated within the LTE transmission and/or reception bandwidth, a form in which the UE is operated in a guard band outside the LTE transmission and/or reception bandwidth, and a form in which the UE is operated within a frequency band dedicated to the NB-IoT.

The eMTC UE and the NB-IoT UE support an enhanced coverage (EC) function using repetition transmission and the like in order to achieve coverage enhancement. Note that the enhanced coverage may be referred to as Coverage Enhancement (CE).

The coverage enhancement function may include repetition transmission (repetition) in which an identical signal is repeatedly transmitted using a plurality of subframes. A larger number of repetition transmissions more significantly enhances the coverage.

The coverage enhancement function may include power boosting that increases the power density of a transmission signal. As an example, the power density is increased by narrowband transmission that narrows the frequency bandwidth of the transmission signal. An increased power density of the transmission signal allows the coverage to be more significantly enhanced. The coverage enhancement function may include lower MCS transmission that reduces the level of the MCS used for the transmission signal. The coverage can be enhanced by performing transmission by using an MCS with a low data rate and high error resistance.

The coverage enhancement function includes a plurality of coverage enhancement states having different degrees of enhancing coverage. A determination method of the coverage enhancement state will be described later.

Note that, in the RRC idle state or the RRC inactive state, the UE existing in the enhanced coverage may perform cell reselection using ranking based on received power (reference signal received power (RSRP)). For example, the UE calculates the ranking Rs of the current serving cell and the ranking Rn of a neighboring cell, and selects, as a new serving cell, a cell having a ranking Rn higher than Rs over a predetermined time period (TreselectionRAT).

Determination Method of Coverage Enhancement State

Figure 8:
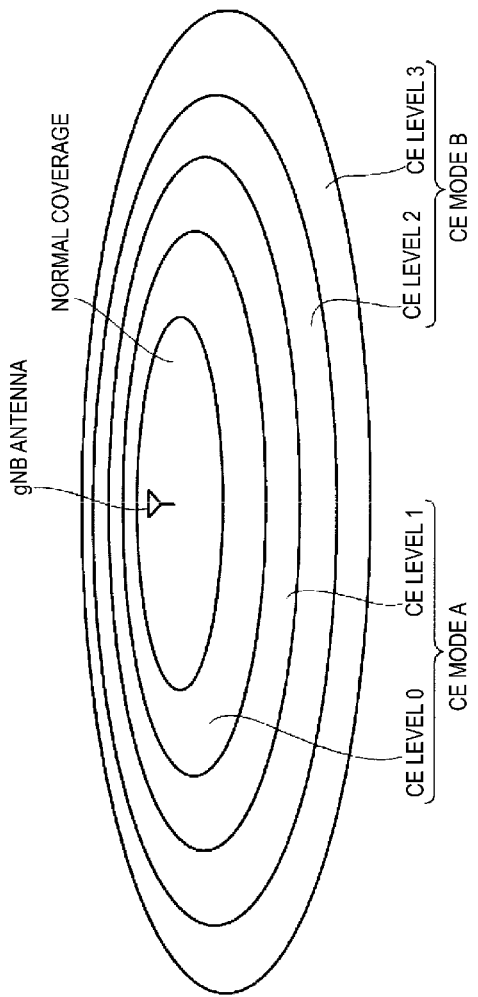
FIG. 8 is a diagram illustrating an example of a coverage enhancement state in the mobile communication system according to an embodiment.

FIG. 8 is a diagram illustrating an example of the coverage enhancement state in the mobile communication system according to an embodiment.

The coverage enhancement state (hereinafter referred to as a "CE state") may include a coverage enhancement level (hereinafter referred to as a "CE level") and a coverage enhancement mode (hereinafter referred to as a "CE mode").

As illustrated in FIG. 8, the CE mode at least includes CE mode A and CE mode B. CE mode B is a state in which the coverage is further enhanced than in CE mode A. CE mode B supports a larger number of repetition transmissions than in CE mode A. The UE (for example, the eMTC UE) supporting the coverage enhancement function supports at least CE mode A.

The CE level includes at least four levels, i.e., level 0 to level 3. The CE mode and the CE level may be associated with each other. In the example of FIG. 8, CE levels 0 and 1 correspond to CE mode A, and CE levels 2 and 3 correspond to CE mode B. The CE mode and the CE level need not be associated with each other.

When the first cell selection criteria (first S-criteria) for normal coverage are not satisfied, and the second cell selection criteria (second S-criteria) for CE mode A are satisfied, the UE 100 in the RRC idle state or the RRC inactive state may determine that the UE 100 exists in the enhanced coverage. When the UE 100 supports CE mode B, the second S-criteria are not satisfied, and the third cell selection criteria (third S-criteria) for CE mode B are satisfied, the UE 100 may determine that the UE 100 exists in the enhanced coverage. The "UE existing in the enhanced coverage" may mean a UE that is required to use the coverage enhancement function to access a cell.

The UE 100 determines its own CE level after determining that the UE 100 exists in the enhanced coverage.

The UE 100 measures reference signal received power (RSRP), compares the measured RSRP with an RSRP threshold for each CE level, and thereby determines its own CE level (one of CE levels 0 to 3). The RSRP threshold for each CE level may be configured by system information broadcast by the serving cell of the UE 100.

The UE 100 may determine its own CE level when the UE 100 performs the random access procedure. When the UE 100 performs the random access procedure for the serving cell, the UE 100 performs the RA preamble transmission for the serving cell by using physical random access channel (PRACH) resources (frequency resource, time resource, preamble, or the like) corresponding to its own CE level. Correspondence between the CE level and the PRACH resources may be configured by system information. When the UE 100 cannot receive a random access (RA) response from the serving cell within a predetermined period of time, the UE 100 may transmit the RA preamble again. When the UE 100 still cannot receive the RA response even after the number of transmissions of the RA preamble has reached a certain number, the UE 100 may determine its own CE level as the next level. For example, when the UE 100 still cannot receive the RA response even after the number of transmissions of the RA preamble transmitted using the PRACH resources corresponding to CE level 0 has reached a certain number, the UE 100 determines that its own CE level is CE level 1. Such a certain number may be configured by system information. Subsequently, the UE 100 may transmit the RA preamble to the serving cell by using the PRACH resources corresponding to CE level 1.

The UE 100 may determine, as its own CE level, the CE level corresponding to the PRACH resources used at the time of transmitting the RA preamble corresponding to the RA response successfully received.

The UE 100 may determine its own CE mode, based on the correspondence between the CE mode and the CE level. In the example of FIG. 8, the UE 100 determines that its own CE mode is CE mode A when its own CE level is level 0 or 1, whereas the UE 100 determines that its own CE mode is CE mode B when its own CE level is level 2 or 3. The UE 100 may determine its own CE mode by using other criteria. For example, when the UE 100 determines that the UE 100 exists in the enhanced coverage in response to the fact that the second cell selection criteria for CE mode A are satisfied, the UE 100 may determine that its own CE mode is CE mode A.

When the UE 100 is in the RRC connected state, the UE 100 may configure the CE mode from the serving cell. The CE mode may be configured by dedicated RRC signaling from the serving cell.

When the UE 100 receives RRC signaling indicating CE mode A, the UE 100 determines that its own CE mode is CE mode A. When the UE 100 receives RRC signaling indicating CE mode B, the UE 100 determines that its own CE mode is CE mode B.

The CE state may be indicated by one of a plurality of received power ranges (RSRP ranges). The plurality of RSRP ranges may be configured by system information broadcast by the serving cell of the UE 100. The UE 100 measures RSRP, and determines the RSRP range to which the measured RSRP belongs. For example, when RSRP ranges #1 to #3 are configured, and the measured RSRP belongs to RSRP range #1, the UE 100 determines that its own CE state is RSRP range #1.

When the UE 100 performs uplink (UL) communication, the UE 100 applies a UL parameter according to its own CE state. The UL parameter may be configured for the UE 100 by RRC signaling. The UL parameter may be configured for the UE 100 by system information. The UL parameter includes the number of UL repetitions, transmission power, and the like. The number of UL repetitions may include the number of repetitions to be applied to UL transmission. The number of UL repetitions may include the maximum number of repetitions to be applied to UL transmission. The number of UL repetitions may be configured for each UL channel. For example, the number of UL repetitions may include the number of repetitions of a physical uplink control channel (PUCCH), the number of repetitions of a physical uplink shared channel (PUSCH), the number of repetitions of a PRACH, and the like. The above-described certain number regarding the number of transmissions of the RA preamble may be the maximum number of repetitions of the PRACH.

When the UE 100 performs downlink (DL) communication, the UE 100 applies a DL parameter according to its own CE state. The DL parameter may be configured for the UE 100 by RRC signaling. The DL parameter may be configured for the UE 100 by system information. The DL parameter includes the number of DL repetitions and the like. The number of DL repetitions may include the number of repetitions to be applied to DL transmission. The number of DL repetitions may include the maximum number of repetitions to be applied to DL transmission. The number of DL repetitions may be configured for each DL channel. For example, the number of DL repetitions may include the number of repetitions of a PDCCH, the number of repetitions of a PDSCH, and the like.

Overview of SC-PTM

Next, an overview of SC-PTM will be described. In 3GPP, Multimedia Broadcast Multicast Service (MBMS) transmission, in which multicast/broadcast services are provided for user equipment, has been specified. Schemes of MBMS include two schemes, i.e., Multicast Broadcast Single Frequency Network (MBSFN) and Single Cell Point-To-Multipoint (SC-PTM). In MBSFN, data is transmitted via a physical multicast channel (PMCH) in the unit of an MBSFN area including a plurality of cells. In SC-PTM, by contrast, data is transmitted via a PDSCH in the unit of a cell.

The UE 100 may receive the MBMS service in the RRC connected state, or may receive the MBMS service in the RRC idle state or the RRC inactive state.

Figure 9:
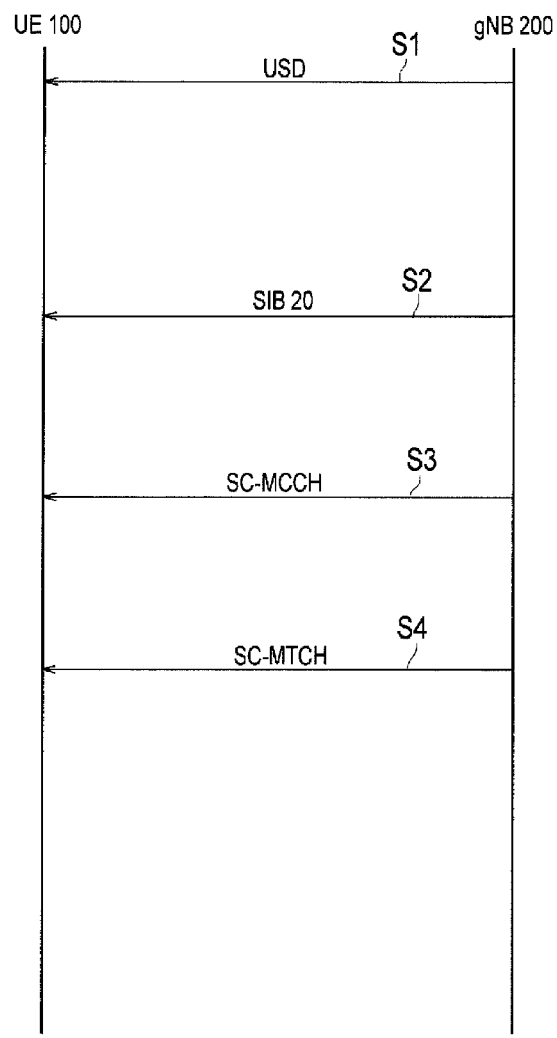
FIG. 9 is a diagram illustrating an operation example of reception of SC-PTM.

FIG. 9 is a diagram illustrating an operation example of reception of SC-PTM. As illustrated in FIG. 9, in Step S1, the UE 100 acquires User Service Description (USD) from the 5GC 20 via the gNB 200. The USD provides basic information of each MBMS service. The USD includes, for each MBMS service, a TMGI for identifying the MBMS service, a frequency in which the MBMS service is provided, and start and end time of provision of the MBMS service.

In Step S2, the UE 100 receives an SIB 20 from the gNB 200 via a broadcast control channel (BCCH). The SIB 20 includes information (scheduling information) necessary for acquisition of the SC-MCCH. The SIB 20 includes sc-mcch-ModificationPeriod indicating a period in which contents of the SC-MCCH may be changed, sc-mcch-RepetitionPeriod indicating a transmission (retransmission) period of the SC-MCCH in the number of radio frames, sc-mcch-Offset indicating an offset of a radio frame in which the SC-MCCH is scheduled, sc-mcch-Subframe indicating a subframe in which the SC-MCCH is scheduled, and the like.

In Step S3, the UE 100 receives MBMS control information from the gNB 200 via the SC-MCCH, based on the SIB 20. The MBMS control information may be referred to as SC-PTM configuration information (SCPTM Configuration). In a physical layer, a Single Cell RNTI (SC-RNTI) is used for transmission of the SC-MCCH. The SC-PTM configuration information includes control information that can be applied to the MBMS service transmitted via a Single Cell MBMS Point to Multipoint Radio Bearer (SC-MRB). The SC-PTM configuration information includes sc-mtch-InfoList including a configuration of each SC-MTCH in a cell for transmitting the information, and scptmNeighbourCellList being a list of neighboring cells providing MBMS services via the SC-MRB. sc-mtch-InfoList includes one or a plurality of pieces of SC-MTCH-Info. Each piece of SC-MTCH-Info includes information (mbmsSessionInfo) of an ongoing MBMS session transmitted via the SC-MRB, a Group RNTI (G-RNTI) corresponding to the MBMS session, and sc-mtch-schedulingInfo being DRX information for the SC-MTCH. mbmsSessionInfo includes a TMGI for identifying the MBMS service and a session ID (sessionId). The G-RNTI is an RNTI for identifying a multicast group (specifically, an SC-MTCH to be transmitted to a specific group). The G-RNTI is mapped to the TMGI on a one-to-one basis. sc-mtch-schedulingInfo includes onDurationTimerSCPTM, drx-InactivityTimerSCPTM, and schedulingPeriodStartOffsetSCPTM. schedulingPeriodStartOffsetSCPTM includes SC-MTCH-SchedulingCycle and SC-MTCH-SchedulingOffset.

In Step S4, the UE 100 receives the MBMS service (MBMS data) corresponding to the TMGI in which the UE 100 is interested via the SC-MTCH, based on SC-MTCH-SchedulingInfo in the SC-PTM configuration information. In the physical layer, the gNB 200 transmits the PDCCH by using the G-RNTI, and then transmits the MBMS data via the PDSCH.

When the UE 100 performs SC-PTM reception, the UE 100 may attempt the reception by applying the number of repetitions (for example, the number of BCCH repetitions, the number of SC-MCCH repetitions, the number of SC-MTCH repetitions, or the like) corresponding to each channel described above (the BCCH, the SC-MCCH, the SC-MTCH, or the like for carrying the SIB 20). The number of BCCH repetitions, the number of SC-MCCH repetitions, and the number of SC-MTCH repetitions may be configured for each CE state.

First Embodiment

Figure 10:
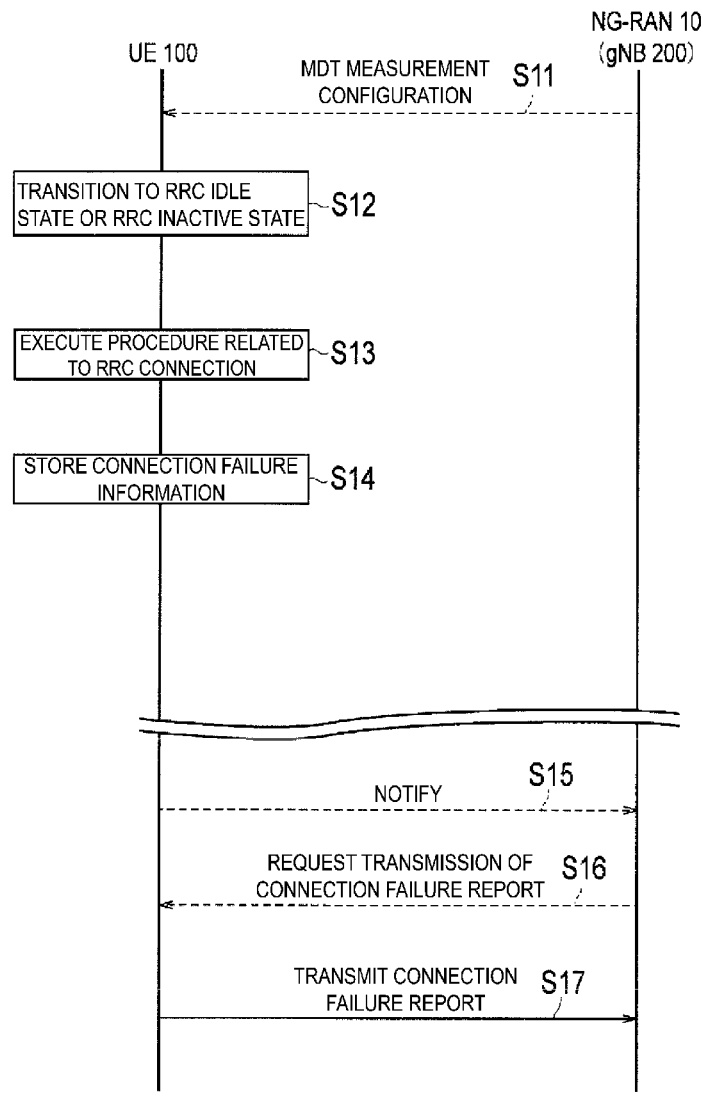
FIG. 10 is a diagram illustrating an operation flow in the mobile communication system according to the first embodiment.

Next, operation of the mobile communication system according to the first embodiment will be described. FIG. 10 is a diagram illustrating an operation flow in the mobile communication system according to the first embodiment. In the operation flow, for example, execution is carried out by the UE 100 being an eMTC UE or an NB-IoT UE.

In Step S11, the gNB 200 transmits MDT measurement configuration to the UE 100. At this time point, the UE 100 is in the RRC connected state. In Step S12, the UE 100 transitions from the RRC connected state to the RRC idle state or the RRC inactive state.

The operation of Steps S11 to S12 may be omitted. Operation from Step S13 will be described below, on the assumption that the UE 100 exists in the enhanced coverage after the UE 100 transitions to the RRC idle state or the RRC inactive state.

In Step S13, the UE 100 executes a procedure related to RRC connection. When the UE 100 fails in the procedure, in Step S14, the UE 100 stores connection failure information related to the failure in the procedure. Here, the "procedure related to RRC connection" may be an RRC connection establishment procedure for establishing new RRC connection, or may be an RRC connection resume procedure for resuming suspended RRC connection. In response to success in the RRC connection establishment procedure and the RRC connection resume procedure, the UE 100 transitions to the RRC connected state. The RRC connection establishment procedure and the RRC connection resume procedure may be referred to as a procedure for transitioning to the RRC connected state.

Note that, in the RRC idle state or the RRC inactive state, the UE 100 may fail in the procedure related to RRC connection a plurality of times. In this case, the UE 100 executes the processing of Steps S13 and S14 a plurality of times, and stores connection failure information related to the failures for the plurality of times (Step S14).

Figure 11:
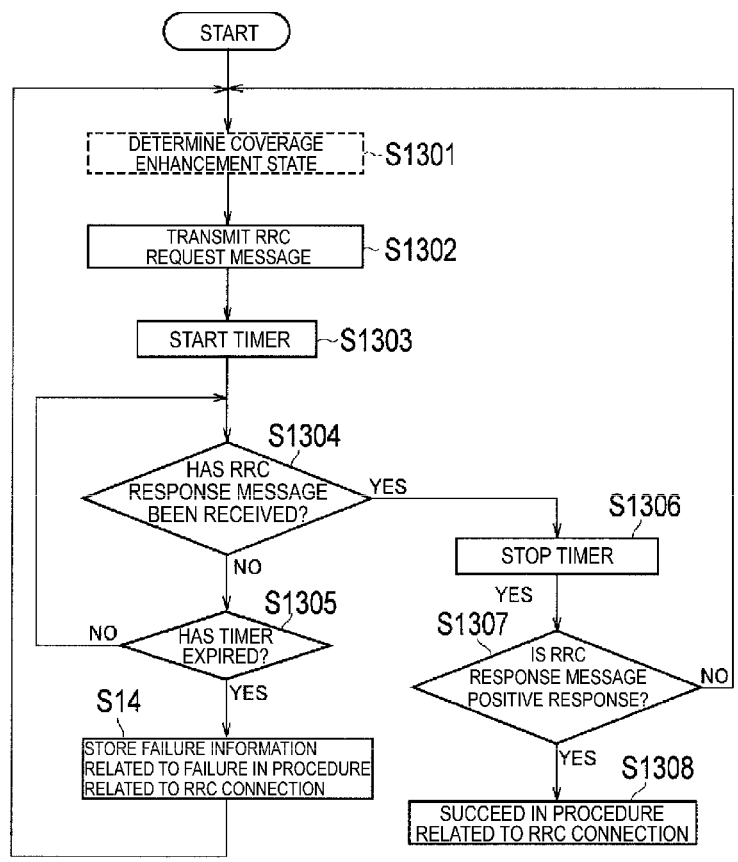
FIG. 11 is a diagram illustrating details of a part of the operation flow of FIG. 10.

Details of Step S13 to Step S14 will be described with reference to FIG. 11. FIG. 11 is a diagram illustrating details of Step S13 to Step S14.

In Step S1301, the UE 100 determines its own CE state by using the above-described determination method of the coverage enhancement state. For example, the UE 100 may determine its own CE level according to measured RSRP. The UE 100 may determine, as its own CE level, the CE level corresponding to the PRACH resources used at the time of transmitting the RA preamble corresponding to the RA response successfully received. Note that, when the UE 100 does not exist in the enhanced coverage (in other words, when the UE 100 exists in the normal coverage), Step S1301 need not be performed.

In Step S1302, the UE 100 initiates the procedure related to RRC connection, and transmits an RRC request message corresponding to the procedure to the serving cell (gNB 200). The UE 100 may transmit the RRC request message in response to reception of the RA response. When the procedure related to RRC connection is the RRC connection establishment procedure, the RRC request message is an RRCSetupRequest message. When the procedure related to RRC connection is the RRC connection resume procedure, the RRC request message is an RRCResuemeRequest message.

In Step S1303, the UE 100 starts a timer in response to transmission of the RRC request message. The value of the timer may be configured by system information broadcast from the serving cell. The value of the timer may be different depending on a type of the "procedure related to RRC connection" (RRC connection establishment, RRC connection resume, or the like). The value of the timer may be different depending on a type of the CE mode (CE mode A, CE mode B, or the like). When repetition transmission is applied to transmission of the RRC request message, the UE 100 may start the timer in response to the first transmission in the repetition transmissions. Alternatively, the UE 100 may start the timer in response to the last transmission in the repetition transmissions. For example, when the maximum number of repetition transmissions regarding the repetition transmissions is configured for the UE 100, the UE 100 may consider transmission performed immediately before reaching the maximum number of repetition transmissions as the last transmission.

In Step S1304 to Step S1305, the UE 100 attempts reception of an RRC response message in response to the RRC request message before the timer expires.

When the timer expires (Step S1305: YES), the UE 100 proceeds to Step S14. Here, when the UE 100 fails to receive the RRC response message before the timer expires, the UE 100 considers that the procedure related to RRC connection fails, and stores failure information related to the failure in the procedure related to RRC connection.

In contrast, when the UE 100 successfully receives the RRC response message before the timer expires (Step S1304: YES), in Step S1306, the UE 100 stops the timer, and proceeds to Step S1307.

In Step S1307, the UE 100 determines whether or not the received RRC response message is a positive response. When the RRC response message is a positive response (Step S1307: YES), in Step S1308, the UE 100 succeeds in the procedure related to RRC connection.

In contrast, when the RRC response message is not a positive response (Step S1307: NO), the UE 100 may initiate the procedure related to RRC connection again. The UE 100 may initiate the procedure for the same serving cell, or may select a new serving cell and initiate the procedure for the new serving cell.

Here, the operation of Step S14 will be described. In Step S14, the UE 100 stores the connection failure information related to the failure in the procedure related to RRC connection in a storage area for the connection failure information. The storage area for the connection failure information is, for example, provided in a memory included in the controller 130. The connection failure information includes at least one piece of information out of the following (a) to (d).

(a) Enhancement State Information

The UE 100 stores, in the connection failure information, the enhancement state information indicating its own CE state (CE state determined in Step S1301) when failing in the procedure related to RRC connection. The enhancement state information may indicate one of the CE level, the CE mode, and the RSRP range, or may indicate a combination of two or more of these. For example, the enhancement state information indicates CE mode A and CE level 0. The enhancement state information may indicate RSRP range #1.

(b) Failure Count Information

The UE 100 stores, in the connection failure information, failure count information indicating the number of failures in the procedure related to RRC connection (hereinafter referred to as a "failure count"). Specifically, the UE 100 holds a counter for counting the failure count, and stores the value of the counter as the failure count information. For example, the UE 100 increments the value of the counter by 1 in response to expiration of the timer (Step S1305: YES) corresponding to the transmitted RRC request message, and updates the failure count information.

The UE 100 may store the failure count information associated with the enhancement state information. In other words, the UE 100 counts the failure count for each CE state. Specifically, the UE 100 holds the above-described counter for each CE state, and counts the number of failures in the procedure related to RRC connection executed by the UE 100 in the same CE state. For example, the UE 100 holds a counter (counter_CE0) corresponding to CE level 0, and the UE 100 increments counter_CE0 by 1 when the timer corresponding to the RRC request message transmitted at the time when its own CE level is CE level 0 (in Step S1301, the CE level is determined as CE level 0) expires (Step S1305: YES).

Basically, the UE 100 counts the failure count for each serving cell; however, the UE 100 may count a total failure count of the procedure related to RRC connection executed within a predetermined period of time (for example, 48 h) regardless of the serving cell. In this case, the UE 100 may hold counter_Total corresponding to the total failure count.

(c) Failure Cell Identification Information

The UE 100 stores, in the connection failure information, a cell identifier of the serving cell that has failed in the procedure related to RRC connection as failure cell identification information. The cell identifier may be an Evolved Cell Global Identifier (ECGI).

(d) Measurement Value of Radio Environment

The UE 100 stores, in the connection failure information, the measurement value of a radio environment of the UE 100 when the UE 100 fails in the procedure related to RRC connection. The measurement value may be RSRP, or may be reference signal received quality (RSRQ). The UE 100 may store, in the connection failure information, the measurement value only when the UE 100 exists in the enhanced coverage.

The UE 100 measures the radio environment every time the UE 100 fails in the procedure related to RRC connection, and stores the measurement value.

When the UE 100 fails in the procedure related to RRC connection a plurality of times, the UE 100 may calculate one statistical value from the measurement values for the plurality of times stored in the connection failure information. The UE 100 may start calculation of the statistical value when the number of failures in the procedure related to RRC connection (for example, the number indicated by the failure count information) reaches a threshold. The threshold may be configured from the gNB 200. For example, the threshold may be configured from the gNB 200 by an MDT measurement configuration message described later. The UE 100 may store the measurement value for each CE state.

The UE 100 may calculate an average value as the statistical value, based on the plurality of measurement values measured for the plurality of times, and the number of failures in the procedure related to RRC connection. The UE 100 may use the maximum value in the plurality of measurement values as the statistical value. The UE 100 may use the minimum value in the plurality of measurement values as the statistical value.

When the UE 100 calculates one statistical value from the plurality of stored measurement values, the UE 100 may store the one statistical value as the measurement value of the radio environment, instead of the plurality of measurement values. Consequently, the size of the storage area occupied by storage of the plurality of measurement values can be reduced.

In addition to the pieces of information of (a) to (d) described above, the connection failure information may include existing information related to MDT measurement, such as position information and a timestamp. The position information may be information indicating a geographical position of the UE 100 when the procedure related to RRC connection fails. The position information may be acquired from a GNSS receiver of the UE 100.

In Step S14, basically, the UE 100 stores the connection failure information autonomously; however, when Step S11 is performed, the UE 100 may store the connection failure information according to the configuration message (MDT measurement configuration message) from the gNB 200. For example, when the CE state is indicated by the configuration message (MDT measurement configuration), the UE 100 may store the failure count information associated only with the indicated CE state.

Note that, after Step S14, the UE 100 may bring the operation back to Step S1301 and initiate the procedure related to RRC connection again.

Referring back to FIG. 10, operation in and after Step S15 will be described. In Step S15, the UE 100 transmits, to the gNB 200, a notification message indicating that the UE 100 holds the connection failure information. The notification message may be referred to as an availability indicator. The availability indicator may be a message for giving a notification about presence of the connection failure information stored when the UE 100 exists in the enhanced coverage. The UE 100 may transmit the notification message when the UE 100 transitions from the RRC idle state or the RRC inactive state to the RRC connected state, at the time of a handover, or the like.

Note that the gNB 200 that manages the cell in which the UE 100 exists at the time of the MDT measurement configuration (Step S11) and the gNB 200 that manages the cell in which the UE 100 exists at the time of the notification (Step S15) may be different.

In Step S16, the gNB 200 transmits, to the UE 100, a report request message for requesting the UE 100 to transmit (report) a connection failure report including the connection failure information, based on the notification message from the UE 100.

In Step S17, in response to the report request message, the UE 100 transmits a connection failure report to the gNB 200. The report request message may indicate piece(s) of information (for example, the above-described pieces of information (a) to (d)) to be included in the connection failure report. The UE 100 may transmit the connection failure report including only the piece(s) of information indicated by the report request message. The connection failure report includes the enhancement state information, and the failure count information associated with the enhancement state information. The connection failure report includes the statistical value calculated from the measurement values of the radio environment.

When the UE 100 stores the connection failure information across a plurality of cells, the connection failure report including the connection failure information for each cell may be transmitted.

Gist of First Embodiment

As described above, the UE 100 transmits, to a network, a failure report related to a failure in a procedure related to RRC connection executed by the UE 100 when the UE 100 exists in enhanced coverage of a serving cell. The failure report includes enhancement state information indicating a CE state of the UE 100 in the enhanced coverage, and failure count information associated with the enhancement state information. The failure count information indicates the number of times the UE 100 fails in the procedure in the CE state. This allows the network to know accessibility for each CE state, and appropriately configure a transmission parameter such as the number of repetition transmissions corresponding to the CE state.

Modification Example 1 of First Embodiment

In the first embodiment, it is assumed that the UE 100 in the RRC idle state or the RRC inactive state; however, in modification example 1 of the first embodiment, it is assumed that the UE 100 is in the RRC connected state.

In modification example 1 of the first embodiment, the UE 100 performs the operation of Step S13 to Step S14 in the RRC connected state. When the UE 100 is in the RRC connected state, the "procedure related to RRC connection" is an RRC connection re-establishment procedure for re-establishing RRC connection. The RRC connection re-establishment procedure may be performed in response to the fact that the UE 100 has detected a radio link failure (RLF) regarding an RRC connection destination cell.

In Step S1302, the UE 100 transmits an RRCReestablishmentRequest message as an RRC request message. In Step S14, the UE 100 stores enhancement state information, failure count information, and the like corresponding to the RRC connection re-establishment procedure. The UE 100 transmits a connection failure report including the enhancement state information, the failure count information, and the like corresponding to the RRC connection re-establishment procedure in response to success in the connection re-establishment procedure, without performing operation of Step S15 and Step S16.

Modification Example 2 of First Embodiment

The first embodiment has described an example in which the failure cell identification information is included in the connection failure information; however, information in the unit of an area larger than a cell may be included in the connection failure information. Examples of the unit of a large area as described above include a RAN notification area (RNA) being a unit of an area in which paging initiated by a RAN is performed, an MBSFN area being a unit of an area in which an MBMS is provided, and a tracking area being a unit of an area in which paging initiated by an AMF is performed. The following description will be given by taking the RAN notification area as an example of the unit of a large area as described above.

The RAN notification area is also referred to as a RAN-based Notification Area, a RAN paging area, or a RAN location update area.

The RAN notification area may include one or a plurality of cells. The RAN notification area may be configured for the UE 100 by an RRC Release message used by the gNB 200 to cause the UE 100 to transition to the RRC inactive state.

The UE 100 in the RRC inactive state need not notify (report to) a network that the UE 100 has performed cell reselection even if the UE 100 moves between cells due to cell reselection within the RAN notification area. The UE 100 in the RRC inactive state requests the network to update the RAN notification area when the UE 100 reselects a cell outside the RAN notification area.

The UE 100 can execute the RRC connection resume procedure in a cell belonging to the RAN notification area configured for the UE 100.

The UE 100 stores, in the connection failure information, RAN notification area information for identifying the RAN notification area.

The UE 100 may store information (the enhancement state information, the measurement value of the radio environment, or the like described above) such as the failure count information being associated with the RAN notification area information. For example, the UE 100 counts the failure count for each RAN notification area. Specifically, the UE 100 holds a counter corresponding to the RAN notification area, and counts the number of failures in the RRC connection resume procedure executed in the same RAN notification area.

The UE 100 transmits, to a network, a failure report including the RAN notification area information, and the information (the enhancement state information, the measurement value of the radio environment, or the like described above) such as the failure count information being associated with the RAN notification area information. Therefore, the network becomes able to know accessibility for each RAN notification area, and configure a more appropriate RAN notification area for the UE 100.

The UE 100 may store, in the connection failure information, information in the unit of an area smaller than a cell. Examples of the unit of a small area as described above include a beam in a cell. One cell may include a plurality of beams. Each beam broadcasts a beam identifier of the beam.

The UE 100 may store information (the enhancement state information, the measurement value of the radio environment, or the like) such as the failure count information being associated with the beam identifier for identifying the beam.

The UE 100 transmits, to a network, a failure report including the beam identifier, and the information (the enhancement state information, the measurement value of the radio environment, or the like) such as the failure count information being associated with the beam identifier. Consequently, the network becomes able to know accessibility for each beam, and achieve detailed optimization for each beam.

Second Embodiment

Figure 12:
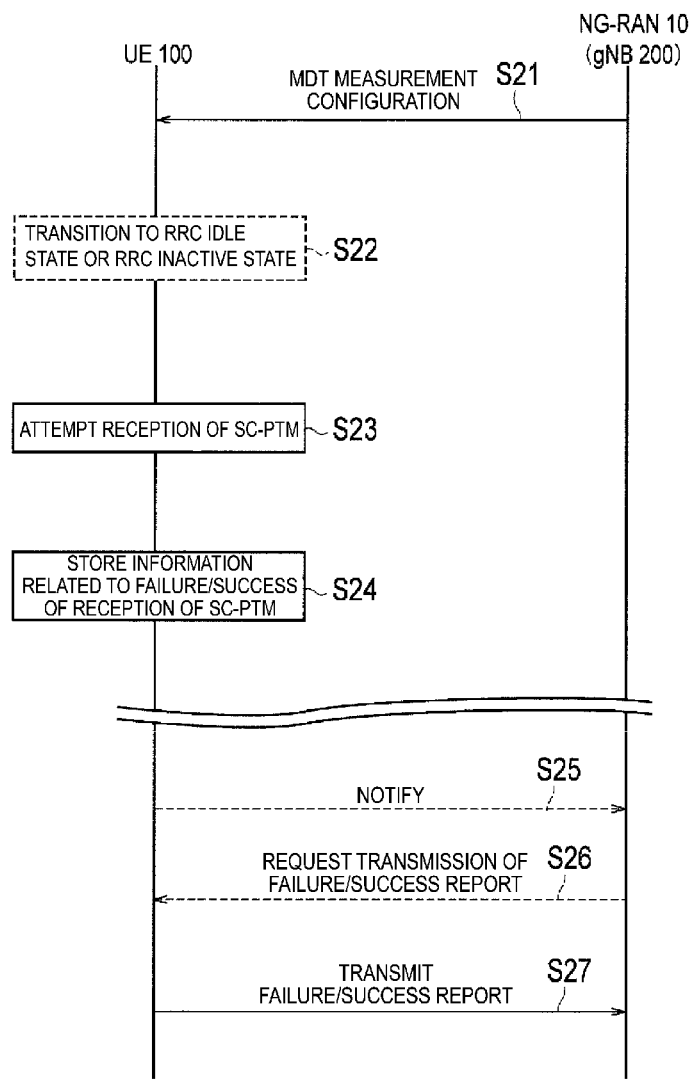
FIG. 12 is a diagram illustrating an operation flow in the mobile communication system according to the second embodiment.

Next, operation of the mobile communication system according to the second embodiment will be described. FIG. 12 is a diagram illustrating an operation flow in the mobile communication system according to the second embodiment.

The second embodiment is an embodiment related to operation in which data related to a reception state of the SC-PTM is collected using the MDT function.

In Step S21, the gNB 200 transmits an MDT measurement configuration message for configuring logged MDT to the UE 100 in the RRC connected state. The UE 100 receives the MDT measurement configuration message, and stores various configuration parameters included in the received MDT measurement configuration message. The configuration parameter may indicate the CE state. A measurement parameter may indicate a specific MBMS service.

In Step S22, after ending communication with the gNB 200, the UE 100 transitions to the RRC idle state or the RRC inactive state from the RRC connected state, and starts operation of logged MDT according to the MDT configuration parameter.

Alternatively, in the RRC connected state, the UE 100 may perform operation of logged MDT according to the MDT configuration parameter.

In Step S23, the UE 100 attempts reception of SC-PTM. In Step S24, the UE 100 stores SC-PTM failure information or SC-PTM success information related to reception of SC-PTM.

Figure 13:
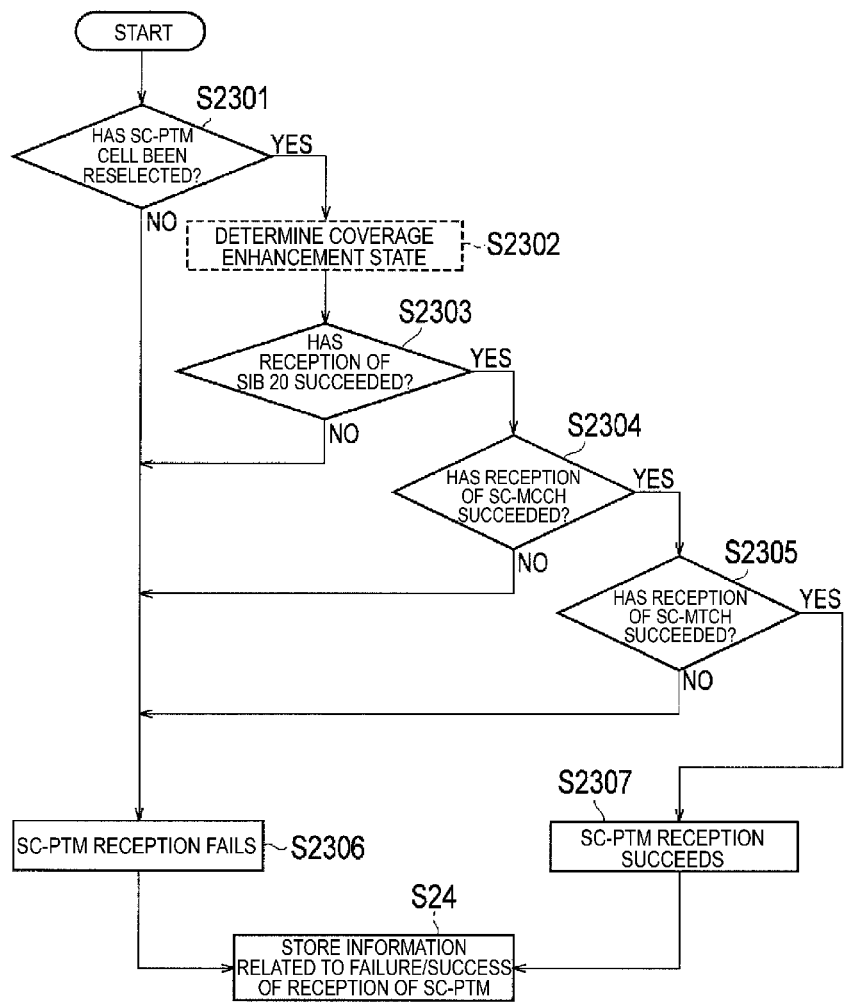
FIG. 13 is a diagram illustrating details of a part of the operation flow of FIG. 12.

Details of Step S23 and Step S24 will be described with reference to FIG. 13. FIG. 13 is a diagram illustrating details of Step S23 and Step S24.

In Step S2301 to Step S2305, the UE 100 attempts reception of SC-PTM for receiving a specific MBMS service. The specific MBMS service may be an MBMS service in which the UE 100 is interested, or may be an MBMS service indicated by the MDT measurement configuration message in Step S21.

In Step S2301, the UE 100 attempts cell reselection to a cell (SC-PTM cell) of a frequency (SC-PTM frequency) for providing the specific MBMS service by using SC-PTM. The cell reselection is performed according to a cell reselection procedure defined in 3GPP. When the UE 100 cannot detect an SC-PTM cell that satisfies criteria (R-criteria or the like) related to the cell reselection, the UE 100 considers that the cell reselection to the SC-PTM cell has failed.

When the cell reselection to the SC-PTM cell fails (Step S2301: NO), the UE 100 determines that SC-PTM reception has failed (Step S2306). Then, in Step S24, the UE 100 stores SC-PTM failure information related to the failure in reception of the SC-PTM. Details of the operation of Step S24 will be described later.

In contrast, when the cell reselection to the SC-PTM cell succeeds (Step S2301: YES), the UE 100 proceeds to S2302.

In Step S2302, the UE 100 determines its own CE state by using the above-described determination method of the coverage enhancement state. Note that, when the UE 100 does not exist in the enhanced coverage (in other words, when the UE 100 exists in the normal coverage), Step S2302 need not be performed.

In Step S2303, the UE 100 attempts reception of the SIB 20. When the UE 100 exists in the enhanced coverage, the UE 100 may attempt reception of the SIB 20 within the range of the maximum number of repetitions being configured (for example, the maximum number of repetitions of the BCCH). When the UE 100 cannot receive the SIB 20 within the maximum number of repetitions being applied (specifically, when the UE 100 fails in decoding of the SIB 20), the UE 100 may determine that the UE 100 has failed in reception of the SIB 20. When the UE 100 attempts reception of the SIB 20 within a certain time period and still cannot receive the SIB 20, the UE 100 may determine that the UE 100 has failed in reception of the SIB 20.

When the UE 100 determines a failure in reception of the SIB 20 (Step S2303: NO), the UE 100 determines that SC-PTM reception has failed (Step S2306).

In contrast, when the UE 100 succeeds in reception of the SIB 20 (Step S2303: YES), the UE 100 proceeds to Step S2304.

In Step S2304, the UE 100 attempts reception of an SC-MCCH (SC-PTM configuration information). When the UE 100 exists in the enhanced coverage, the UE 100 may attempt reception of the SC-MCCH within the range of the maximum number of repetitions being configured (for example, the number of repetitions of the SC-MCCH). When the UE 100 cannot receive the SC-MCCH within the maximum number of repetitions being applied, the UE 100 may determine that the UE 100 has failed in reception of the SC-MCCH. When the UE 100 attempts reception of the SC-MCCH within a certain time period and still cannot receive the SC-MCCH, the UE 100 may determine that the UE 100 has failed in reception of the SC-MCCH.

When the UE 100 determines a failure in reception of the SC-MCCH (Step S2304: NO), the UE 100 determines that SC-PTM reception has failed (Step S2306).

In contrast, when the UE 100 succeeds in reception of the SC-MCCH (Step S2304: YES), the UE 100 proceeds to Step S2305.

In Step S2305, the UE 100 attempts reception of the SC-MTCH (MBMS data). When the UE 100 exists in the enhanced coverage, the UE 100 may attempt reception of the SC-MTCH within the range of the maximum number of repetitions (for example, the number of repetitions of the SC-MTCH). When the UE 100 cannot receive the SC-MTCH within the number of repetitions being applied, the UE 100 may determine that the UE 100 has failed in reception of the SC-MTCH. When the UE 100 attempts reception of the SC-MTCH within a certain time period and still cannot receive the SC-MTCH, the UE 100 may determine that the UE 100 has failed in reception of the SC-MTCH.

When the UE 100 determines a failure in reception of the SC-MTCH (Step S2305: NO), the UE 100 determines that SC-PTM reception has failed (Step S2306).

In contrast, when the UE 100 succeeds in reception of the SC-MTCH (Step S2305: YES), the UE 100 determines that the UE 100 has succeeded in reception of SC-PTM (Step S2307).

In Step S24, when the UE 100 determines that SC-PTM reception has failed, the UE 100 stores, in a storage area for the SC-PTM failure information, the SC-PTM failure information related to the failure in reception of the SC-PTM. The storage area for the SC-PTM failure information is provided in a memory included in the controller 130. The SC-PTM failure information includes at least one piece of information out of the following (i) to (vii).

(i) Identification Information of SC-PTM Cell

The UE 100 stores, in the SC-PTM failure information, identification information of the SC-PTM cell that has failed in SC-PTM.

(ii) MBMS Service Identification Information

The UE 100 stores MBMS service identification information in the SC-PTM failure information. The MBMS service identification information is identification information related to an MBMS service (the specific MBMS service described above) that is considered by the UE 100 at the time of a failure in reception of SC-PTM. The MBMS service identification information may include at least one of a TMGI, a session ID, and a G-RNTI.

(iii) Radio Environment Information

The UE 100 stores radio environment information in the SC-PTM failure information. The radio environment information includes the measurement value of the radio environment of the UE 100 at the time of a failure in reception of SC-PTM. The measurement value may be RSRP, or may be RSRQ.

(iv) Enhancement State Information

The UE 100 stores, in the SC-PTM failure information, enhancement state information indicating its own CE state at the time of a failure in reception of SC-PTM. The enhancement state information may indicate one of the CE level, the CE mode, and the RSRP range, or may indicate a combination of two or more of these.

(v) Information of Time Period in which Reception of SC-PTM is Attempted

When the UE 100 exists in the enhanced coverage, the UE 100 stores, in the SC-PTM failure information, information (hereinafter referred to as "time period information") of a time period in which reception of SC-PTM is attempted. The time period information includes at least one of information of a time period in which reception of the SIB 20 is attempted, information of a time period in which reception of the SC-MCCH is attempted, and information of a time period in which reception of the SC-MTCH is attempted. The UE 100 may store the time period information and the enhancement state information being associated with each other.

(vi) Information of Number of Repetitions Applied to Reception of SC-PTM

When the UE 100 exists in the enhanced coverage, the UE 100 stores, in the SC-PTM failure information, information (hereinafter referred to as "repetition count information") of the number of repetitions applied to reception of the SC-PTM. The repetition count information is information related to the number of repetitions applied in each step of Step S2303, Step S2304, and Step S2305. The repetition count information includes at least one of information of the number of repetitions applied to reception of the SIB 20, information of the number of repetitions applied to reception of the SC-MCCH, and information of the number of repetitions applied to reception of the SC-MTCH. The UE 100 may store the repetition count information and the enhancement state information being associated with each other.

(vii) Information of Reason (Cause) of Failure in Reception of SC-PTM

The UE 100 stores, in the SC-PTM failure information, information (hereinafter referred to as "Cause information") of Cause of failure in reception of SC-PTM.

When the UE 100 determines that SC-PTM reception has failed due to a failure in reception of reselection to the SC-PTM cell, the UE 100 stores information indicating the reselection to the SC-PTM cell as the Cause information.

When the UE 100 determines that SC-PTM reception has failed due to a failure in reception of the SIB 20, the UE 100 stores information indicating the failure in reception of the SIB 20 as the Cause information.

When the UE 100 determines that SC-PTM reception has failed due to a failure in reception of the SC-MCCH, the UE 100 stores information indicating the failure in reception of the SC-MCCH as the Cause information.

When the UE 100 determines that SC-PTM reception has failed due to a failure in reception of the SC-MTCH, the UE 100 stores information indicating the failure in reception of the SC-MTCH as the Cause information.

In addition to the pieces of information of (i) to (vii) described above, the SC-PTM failure information may include existing information related to MDT measurement, such as position information and a timestamp. The SC-PTM failure information may include information indicating the SC-PTM frequency.

Next, referring back to FIG. 12, operation in and after Step S25 will be described. In Step S25, the UE 100 transmits, to the gNB 200, a notification message indicating that the UE 100 holds the SC-PTM failure information. The UE 100 may transmit the notification message when the UE 100 transitions from the RRC idle state or the RRC inactive state to the RRC connected state, at the time of a handover, or the like. The notification message may indicate that the UE 100 holds the SC-PTM failure information for each MBMS service.

In Step S26, the gNB 200 transmits, to the UE 100, a report request message for requesting the UE 100 to transmit (report) an SC-PTM failure report including the SC-PTM failure information, based on the notification message from the UE 100.

In Step S27, in response to the report request message, the UE 100 transmits an SC-PTM failure report to the gNB 200. The report request message may indicate piece(s) of information (for example, the above-described pieces of information (i) to (vii)) to be included in the SC-PTM failure report. The report request message may request that the SC-PTM failure information corresponding to a predetermined frequency be included. The report request message may request that the SC-PTM failure information corresponding to a predetermined cell be included. The report request message may request that the SC-PTM failure information corresponding to a predetermined MBMS identifier (TMGI) be included.

The UE 100 may transmit the SC-PTM failure report only including information indicated by the report request message. The SC-PTM failure report includes the radio environment information and the MBMS service identification information. The SC-PTM failure report includes the enhancement state information.

Gist of Second Embodiment

As described above, the UE 100 stores radio environment information related to a radio environment of the UE 100 when there is a failure in reception of SC-PTM when there is a failure in reception of the SC-PTM in which an MBMS service is provided. The UE 100 transmits an SC-PTM failure report including the stored radio environment information to a network. The SC-PTM failure report further includes a service identifier indicating the MBMS service. This allows the network to know a reception state of SC-PTM regarding a specific MBMS service, and appropriately configure SC-PTM configuration (frequency, MCS, number of repetitions, or the like) regarding the specific MBMS service.

Modification Example of Second Embodiment

In the present modification example, information (SC-PTM success information) stored when SC-PTM is successfully received will be described.

As illustrated in FIG. 13, when the UE 100 determines that the UE 100 succeeds in reception of SC-PTM (Step S2307), the UE 100 stores SC-PTM success information in Step S24. The SC-PTM success information includes (i) the identification information of the SC-PTM cell, (ii) the MBMS service identification information, and (iv) the enhancement state information described above.

Only when the UE 100 succeeds in reception of the SC-PTM to which repetition transmission is applied when the UE 100 exists in the enhanced coverage, the UE 100 may store the SC-PTM success information.

The SC-PTM to which repetition transmission is applied includes, as described above, at least one of the SIB 20 to which repetition transmission is applied, the SC-MCCH to which repetition transmission is applied, and the SC-MTCH to which repetition transmission is applied.

The UE 100 further stores, in the SC-PTM success information, count information indicating the ordinal number of transmission of SC-PTM (the SIB 20, the SC-MCCH, the SC-MTCH, or the like) when the reception succeeds.

The UE 100 transmits, to the network, an SC-PTM success report including identification information of an SC-PTM cell, MBMS service identification information, enhancement state information, and count information corresponding to the MBMS service identification information. This allows the network to know the count information of SC-PTM regarding a specific MBMS service, and appropriately configure SC-PTM configuration (number of repetitions or the like) regarding the specific MBMS service. For example, when the number of repetitions of the SC-MTCH configured by the network (number of repetition transmissions of the SC-MTCH) is far greater than the count information of the SC-MTCH included in the SC-PTM success information (number of receptions attempted by the UE before successfully receiving the SC-MTCH), the network can configure the number of repetitions of the SC-MTCH to be small, and effectively utilize the transmission resources of the SC-PTM.

OTHER EMBODIMENTS

In the embodiments described above, an example in which the logged MDT is applied as the MDT has been primarily described, but the immediate MDT may be applied.

In the embodiments described above, the 5G system (NR) has primarily been described. However, the operations according to the embodiments may be applied to LTE.

A program causing a computer to execute each of the processes performed by the UE 100 or the gNB 200 may be provided. The program may be recorded in a computer readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although embodiments have been described in detail with reference to the drawings, a specific configuration is not limited to those described above, and various design modifications and the like can be made without departing from the gist.

The invention claimed is:

1. A communication control method executed by a user equipment, the communication control method comprising:
measuring of a plurality of beams belonging to a serving cell, in a case that a procedure related to radio resource control (RRC) connection executed by the user equipment fails when the user equipment exists in the serving cell;
storing measurement values of results of the measuring;
transmitting, to a network, a failure report including the measurement values each corresponding to a beam of the plurality of beams belonging to the serving cell;
determining that the user equipment successfully receives a predetermined service from a predetermined cell;
in response to determining that the user equipment successfully receives a predetermined service, storing success information in a memory of the user equipment; and
transmitting to the network, the stored success information, wherein
the success information includes:
an identifier of the predetermined cell,
an identifier of the user equipment allocated by the predetermined cell, and
information indicating a number of attempts before successfully receiving the predetermined service.

2. A user equipment comprising a processor and a memory, the processor configured to
measure of a plurality of beams belonging to a serving cell, in a case that a procedure related to radio resource control (RRC) connection executed by the user equipment fails when the user equipment exists in the serving cell,
store measurement values of results of the measuring,
transmit, to a network, a failure report including the measurement values each corresponding to a beam of the plurality of beams belonging to the serving cell,
determine that the user equipment successfully receives a predetermined service from a predetermined cell;
in response to determining that the user equipment successfully receives a predetermined service, store success information in a memory of the user equipment; and
transmit to the network, the stored success information, wherein
the success information includes:
an identifier of the predetermined cell,
an identifier of the user equipment allocated by the predetermined cell, and
information indicating a number of attempts before successfully receiving the predetermined service.

3. An apparatus provided in a user equipment, the apparatus comprising a processor and a memory, the processor configured to
measure of a plurality of beams belonging to a serving cell, in a case that a procedure related to radio resource control (RRC) connection executed by the user equipment fails when the user equipment exists in the serving cell,
store measurement values of results of the measuring,
transmit, to a network, a failure report including the measurement values each corresponding to a beam of the plurality of beams belonging to the serving cell, determine that the user equipment successfully receives a predetermined service from a predetermined cell, in response to determining that the user equipment successfully receives a predetermined service, store success information in a memory of the user equipment, and transmit to the network, the stored success information, wherein the success information includes:

an identifier of the predetermined cell, an identifier of the user equipment allocated by the predetermined cell, and information indicating a number of attempts before successfully receiving the predetermined service.

* * * * *